J. G. WHITTIER.
Shoe-Heel Protector.

No. 220,200.  Patented Sept. 30, 1879.

WITNESSES
F. L. Durand
H. Aubrey Toulmin

INVENTOR
J. G. Whittier
Alexander & Mason.
ATTORNEYS

UNITED STATES PATENT OFFICE.

JOSEPH G. WHITTIER, OF ATTICA, INDIANA.

IMPROVEMENT IN SHOE-HEEL PROTECTORS.

Specification forming part of Letters Patent No. 220,200, dated September 30, 1879; application filed August 8, 1879.

*To all whom it may concern:*

Be it known that I, JOSEPH G. WHITTIER, of Attica, in the county of Fountain, and in the State of Indiana, have invented certain new and useful Improvements in Shoe-Heel Protectors; and do hereby declare that the following is a full, clear, and exact description thereof, reference being had to the accompanying drawings, and to the letters of reference marked thereon, making a part of this specification.

The nature of my invention consists in the construction of a heel-protector for boots and shoes, as will be hereinafter more fully set forth.

Figure 1:
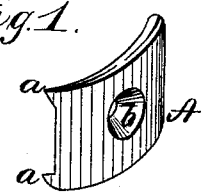
Figure 2:
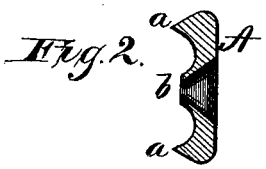
Figure 3:
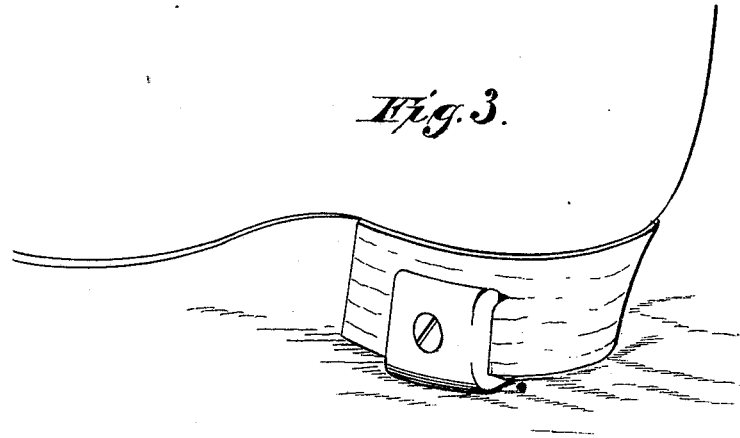

In the annexed drawings, Figure 1 is a perspective view of my invention. Fig. 2 is a central section of the same. Fig. 3 shows the same applied to a heel.

My heel-protector is made of a single piece of cast metal, A, of nearly square form, convex on its outer side, and provided on the inside with a V-shaped edge, $a$, at top and bottom. It has also in the center a countersunk hole, $b$, for the passage of the fastening-screw.

This protector is placed on a level with the bottom of the heel, as shown in Fig. 3, and the edges $a$ $a$ are driven into the heel. Then the screw is put in, the edges preventing the protector from turning when in use.

When one end is worn off, the screw can be loosened and the protector turned half-way around, making it as good as at first, and giving double the wear.

Having thus fully described my invention, what I claim as new, and desire to secure by Letters Patent, is—

The reversible heel-protector A, formed with the top and bottom V-shaped edges $a$ $a$ and the center screw-hole, $b$, substantially as and for the purposes herein set forth.

In testimony that I claim the foregoing I have hereunto set my hand this 4th day of August, 1879.

JOSEPH G. WHITTIER.

Witnesses:
ORANGE S. TULLIS,
THOS. M. POWELL.